United States Patent
Hazen et al.

(10) Patent No.: US 12,486,315 B2
(45) Date of Patent: Dec. 2, 2025

(54) DEVELOPING AN EFFICIENT HYBRIDOMA PLATFORM FOR THERAPEUTIC ANTIBODY DISCOVERY

(71) Applicant: Genentech, Inc., South San Francisco, CA (US)

(72) Inventors: Meredith Carroll Hazen, South San Francisco, CA (US); Zhonghua Lin, South San Francisco, CA (US); Dhaya Seshasayee, South San Francisco, CA (US)

(73) Assignee: GENENTECH, INC., South San Francisco, CA (US)

( * ) Notice: Subject to any disclaimer, the term of this patent is extended or adjusted under 35 U.S.C. 154(b) by 524 days.

(21) Appl. No.: 17/681,665

(22) Filed: Feb. 25, 2022

(65) Prior Publication Data

US 2022/0177551 A1    Jun. 9, 2022

Related U.S. Application Data

(63) Continuation of application No. PCT/US2020/048440, filed on Aug. 28, 2020.

(60) Provisional application No. 62/894,660, filed on Aug. 30, 2019.

(51) Int. Cl.
    *C07K 16/28*    (2006.01)
    *A61K 39/395*   (2006.01)
    *C07K 16/00*    (2006.01)
    *C12N 5/0781*   (2010.01)
    *A61K 39/00*    (2006.01)

(52) U.S. Cl.
    CPC .......... *C07K 16/005* (2013.01); *C12N 5/0635* (2013.01); *A61K 2039/545* (2013.01); *C07K 2317/10* (2013.01)

(58) Field of Classification Search
    None
    See application file for complete search history.

(56) References Cited

U.S. PATENT DOCUMENTS

| | | |
|---|---|---|
| 7,148,040 B2 | 12/2006 | Meagher et al. |
| 2009/0238816 A1 | 9/2009 | Larsen |
| 2010/0255496 A1 | 10/2010 | Schrader |
| 2016/0194407 A1 | 7/2016 | Hay et al. |

FOREIGN PATENT DOCUMENTS

| | | |
|---|---|---|
| WO | 2011146514 A2 | 11/2011 |
| WO | 2018123979 A1 | 7/2018 |
| WO | 2021041834 A1 | 3/2021 |

OTHER PUBLICATIONS

Goldstein et al. (Aug. 9, 2019) "Massively Parallel Single-Cell B-Cell Receptor Sequencing Enables Rapid Discovery of Diverse Antigen-Reactive Antibodies", Communications Biology, 2(304):1-10.
Hsiao et al. (Mar. 22, 2019) "Immune Repertoire Mining for Rapid Affinity Optimization of Mouse Monoclonal Antibodies", MAbs, 11(4):735-746.
Price et al. (Mar. 31, 2009) "Engineered Cell Surface Expression of Membrane Immunoglobulin as a Means to Identify Monoclonal Antibody-secreting Hybridomas", The Journal of Immunological Methods, 343(1):28-41(26 pages).
International Search Report and Written Opinion received for International Application No. PCT/US2020/048440, mailed on Dec. 1, 2020, 10 pages.
European Search Report issued in European Application No. 20858144.7, mailed on Sep. 8, 2023, 9 pages.
Kilpatrick et al. (1997) "Rapid Development of Affinity Matured Monoclonal CO7K Antibodies Using RIMMS", Hybridoma, 16(4):381-389.
Kohler et al. (1975) "Continuous Cultures of Fused Cells Secreting Antibody of Predefined Specificity", Nature, 256:495-497.
Harlow et al. (1988) "Chapter 5: Immunizations", Antibodies. A Laboratory Manual, Cold Spring Harbor Laboratory, ISBN:978-0-87969-374-9, pp. 53-137.
(2006) "Monoclonal Antibody Production", T.K.Craft, retrieved from http://www.tkcraft.co.jp/page/monoab.htm, retrieved on Aug. 16, 2024, 2 pages.
"SD Rat", EMF-Portal, retrieved from https://www.emf-portal.org/ja/glossary/3319, retrieved on Aug. 16, 2024, 1 page.

*Primary Examiner* — Michail A Belyavskyi
(74) *Attorney, Agent, or Firm* — MINTZ, LEVIN, COHN, FERRIS, GLOVSKY AND POPEO, P.C.

(57) ABSTRACT

The instant technology generally relates to improved methods for producing antibodies, antibody libraries, hybridomas, hybridoma libraries, etc. For example, these methods increase the number of antigen-specific B cells produced, increase the number of hybridomas, and/or increase the number of monoclonal antibodies that can be made in a given production cycle.

17 Claims, 9 Drawing Sheets

\* p < 0.01

DEVELOPING AN EFFICIENT HYBRIDOMA PLATFORM FOR THERAPEUTIC ANTIBODY DISCOVERY

CROSS-REFERENCE TO RELATED APPLICATION

This application is a bypass continuation application claiming priority to International Application No. PCT/US2020/048440, filed on Aug. 28, 2020, which claims priority to U.S. Provisional Application No. 62/894,660, filed Aug. 30, 2019, each of which is hereby incorporated by reference in its entirety and for all purposes.

BACKGROUND

Monoclonal antibodies have been used for decades as key reagents in clinical diagnostics and they are emerging as an important new class of therapeutics agents. Hybridoma technology is the most commonly used method for obtaining monoclonal antibodies. Monoclonal antibodies are secreted from hybridoma cells, created by fusing normal antibody producing splenic B-cells with immortal myeloma cells or other immortal cells.

Hybridoma production has changed little since its inception decades ago (Nature 256:495-497 (1975)). A typical protocol for generation of a hybridoma involves: (i) immunizing an animal (e.g., mouse, rat or rabbit) with an antigen; (ii) harvesting antibody producing B-cells, typically from the spleen; (iii) fusing B-cells with a non-secretory myeloma cell line to form hybridomas; (iv) growing hybridoma cells in a selection medium; (v) screening for cells that produce the desired antibody; and (vi) cloning of the desired hybridoma(s) to obtain a homogenous cell line that secretes the antibody.

There is a need to generate increased numbers of antigen-specific antibodies and improve production of monoclonal antibodies and antibody libraries.

SUMMARY

The instant technology generally relates to improved methods for producing antibodies, antibody libraries, hybridomas, hybridoma libraries, etc., as well as to compositions from the various method steps. For example, these methods can increase the number of antigen-specific B cells produced, increase the number of hybridomas, and/or increase the number of monoclonal antibodies that can be made in a given production cycle. The methods described herein can be used to significantly increase the production of antibodies, antibody libraries, hybridomas, hybridoma libraries, etc., as well as compositions from the various method steps, for use in treating a variety of diseases. For example, the methods described herein may be applied to antibody and/or hybridoma generation for the treatment of cancers, immune disorders, inflammatory diseases, and any other disease treatable by antibody therapy. The methods described herein may be applied to antibody and/or hybridoma generation directed to challenging targets. Challenging targets are antigens that are difficult to generate antibodies against, for example because the size of the targetable region is small, the protein conformation is important, and/or the antigen is modified (e.g., by post-translational modification such as glycosylation, phosphorylation, acetylation and methylation). In embodiments, the target antigen is a multipass transmembrane protein. In embodiments, the multipass transmembrane protein is a G protein-coupled receptor (GPCR). In embodiments, the multipass transmembrane protein is an ion pump, ion channel, or transporter.

In an aspect, a method for producing an antibody, antibody library, hybridoma, or hybridoma library is provided. In embodiments, the method may include one or more of the following:
(a) injecting a plurality of animals with an antigen;
(b) harvesting B cells from each animal;
(c) forming a hybridoma between a B cell and a fusion partner; and
(d) screening the hybridoma for binding specificity to the antigen.

In embodiments, at least one and preferably two or more of the following conditions may apply:
(i) the animals are outbred animals;
(ii) the animals are injected at multiple sites;
(iii) the animals are injected at a frequency of not less than every week, not less than every 10 days, not less than every two weeks, or some other frequency of greater duration in between injections;
(iv) the animals are injected for between 6 weeks and 15 weeks;
(v) multiple adjuvants are used, such that each animal is injected with a single adjuvant and at least some animals are injected with a different adjuvant;
(vi) B cells are enriched prior to step (c); and/or
(vii) use of a fusion partner engineered to express both surface and secreted IgG.

In an aspect, a method for producing an antibody, antibody library, hybridoma, or hybridoma library is provided. In embodiments, the method may include one or more of the following:
(a) injecting one or more animals with an antigen;
(b) harvesting B cells from each animal;
(c) forming a hybridoma between a B cell and a fusion partner; and
(d) screening the hybridoma for binding specificity to the antigen.

In embodiments, at least one and preferably two or more of the following conditions may apply:
(i) the animals are outbred animals;
(ii) the animals are injected at multiple sites;
(iii) the animals are injected at a frequency of not less than every week, not less than every 10 days, not less than every two weeks, or some other frequency of greater duration in between injections;
(iv) the animals are injected for between 6 weeks and 15 weeks;
(v) multiple adjuvants are used, such that each animal is injected with a single adjuvant and different animals are injected with a different adjuvant;
(vi) B cells are enriched prior to step (c); and/or
(vii) use of a fusion partner engineered to express both surface and secreted IgG.

In embodiments, at least one and preferably two or more of the following conditions may apply:
(i) the animals are outbred animals;
(ii) the animals are injected at multiple sites;
(iii) the animals are injected at a frequency of not less than every week, not less than every 10 days, not less than every two weeks, or some other frequency of greater duration in between injections;
(iv) the animals are injected for between 6 weeks and 15 weeks;

(v) multiple adjuvants are used, such that each animal is injected with a single adjuvant and different animals are injected with a different adjuvant; and/or (vi) B cells are enriched prior to step (c).

In embodiments, the B cells can be harvested from draining lymph nodes.

In embodiments, the method may include injecting two or more animals with an antigen. In embodiments, the method may include injecting three or more animals with an antigen. In embodiments, the method may include injecting four or more animals with an antigen. In embodiments, the method may include injecting five or more animals with an antigen.

In embodiments, two of conditions (i)-(vii) may apply. In embodiments, three of conditions (i)-(vii) may apply. In embodiments, four of conditions (i)-(vii) may apply. In embodiments, five of conditions (i)-(vii) may apply. In embodiments, six of conditions (i)-(vii) may apply. In embodiments, seven of conditions (i)-(vii) may apply. In embodiments, two of conditions (i)-(vi) may apply. In embodiments, three of conditions (i)-(vi) may apply. In embodiments, four of conditions (i)-(vi) may apply. In embodiments, five of conditions (i)-(vi) may apply. In embodiments, six of conditions (i)-(vi) may apply.

In embodiments, the method may include:

(a) injecting a plurality of outbred rats with an antigen at multiple sites of each rat;
(b) repeating the injection every 2 weeks for at least 6 weeks;
(c) harvesting immune cells from one or more draining lymph node of each rat;
(d) depleting non-B cells from the immune cells by negative selection to form an enriched B cell sample;
(e) contacting the enriched B cell sample with a plurality of fusion partners to form a hybridoma between a B cell and a fusion partner; and screening the hybridoma for specificity to the antigen.

In embodiments, the method may include:

(a) injecting one or more of outbred rats with an antigen at multiple sites of each rat;
(b) repeating the injection every 2 weeks for at least 6 weeks;
(c) harvesting immune cells from one or more draining lymph node of each rat;
(d) depleting non-B cells from the immune cells by negative selection to form an enriched B cell sample;
(e) contacting the enriched B cell sample with a plurality of fusion partners to form a hybridoma between a B cell and a fusion partner; and
(f) screening the hybridoma for specificity to the antigen.

In embodiments, the animals can be rats. In embodiments, the animals can be outbred rats. Examples of outbred rats include, without limitation, Sprague Dawley, Long-Evans, Sentinel, Wistar, Wistar Han, and Holtzman rats. In embodiments, the animals can be transgenic animals. In embodiments, the animals can be transgenic rats.

In embodiments, the animals can be injected at multiple sites. In embodiments, the multiple sites can be sites near draining lymph nodes. In embodiments, the multiple sites may include one or more of back, shoulder, intraperitoneal, base of tail, and hock.

In embodiments, the amount of antigen injected at each site can be between 0.1 µg and 300 µg. In embodiments, the amount of antigen injected at each site can be between 0.5 µg and 200 µg.

In embodiments, the method may include injecting two or more outbred rats with an antigen. In embodiments, the method may include injecting three or more outbred rats with an antigen. In embodiments, the method may include injecting four or more outbred rats with an antigen. In embodiments, the method may include injecting five or more outbred rats with an antigen.

In embodiments, the animals may be injected every two weeks. In embodiments, the animals may be injected not more than once a week. In embodiments, the animals may be injected not more than once every two weeks. In embodiments, the animals may be injected every 5, 6, 7, 8, 9, 10, 11, 12, 13, 14, 15, 16, 17, 18, 19, 20, 21, 22, 23, 24, 25, 26, 27, 28 days or more for between 6 weeks and 20 weeks. In embodiments, the animals may be injected for between 6 weeks and 15 weeks. Injection time includes all values and sub ranges encompassed by recited ranges, inclusive of endpoints.

In embodiments, multiple adjuvants can be used, and each animal (or subset of animals) can be injected with a different adjuvant. For example, the animals can be divided into multiple groups where each member of the group receives a single adjuvant or a combination of adjuvants, and each adjuvant or combination is different from what is received by at least some of the other groups. In embodiments, the multiple adjuvants can include, without limitation, complete Freund's adjuvant (CFR), Ribi, and/or TLR agonist cocktail. In embodiments, CFR can be machine-mixed.

In embodiments, the B cells can be enriched prior to forming a hybridoma. In embodiments, enrichment can include contacting cells harvested from the draining lymph nodes with a binding agent. In embodiments, the B cells can be enriched by negative selection. In embodiments, the binding agent can be specific for a molecule associated with a cell that is not a B cell. In embodiments, the binding agent can be specific for a molecule expressed on the surface of a cell that is not a B cell. In embodiments, the B cells can be enriched by positive selection. In embodiments, the binding agent can be specific for a molecule associated with a B cell. In embodiments, the binding agent can be specific for a molecule expressed on the surface of a B cell. In embodiments, the binding agent can be an antibody. In embodiments, magnetic separation can be used.

In embodiments, the fusion partner can be a cell engineered to express both surface and secreted IgG. In embodiments, the fusion partner can be a Sp2ab fusion partner. In embodiments, screening the hybridomas can include identifying hybridomas that express antibodies that are specific to the antigen. In embodiments, screening the hybridomas can include FACS sorting for expression of IgG antibodies that are specific to the antigen.

DETAILED DESCRIPTION

Figure 1A:
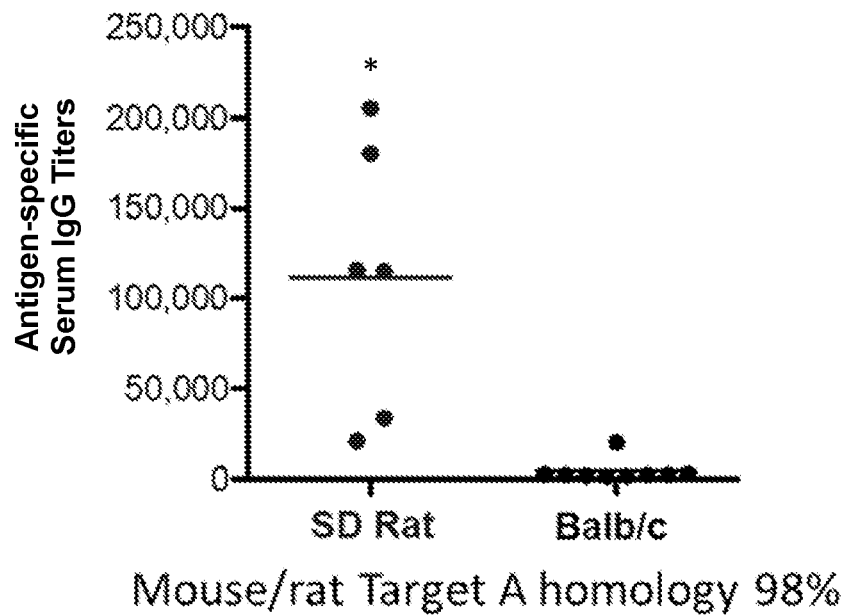
FIG. 1A shows the difference in IgG serum titers when using Sprague Dawley rats (SD Rat) versus Balb/c mice for antibody production for antigen A (Target A). The homology between Target A in mice versus rats is 98%. *$p<0.05$ versus mouse.

After reading this description it will become apparent to one skilled in the art how to implement the present disclosure in various alternative embodiments and alternative applications. However, all the various embodiments of the present technology will not be described herein. It will be understood that the embodiments presented here are presented by way of an example only, and not limitation. As such, this detailed description of various alternative embodiments should not be construed to limit the scope or breadth of the present disclosure as set forth herein.

Before the present technology is disclosed and described, it is to be understood that the aspects described below are not limited to specific compositions, methods of preparing such compositions, or uses thereof as such may, of course, vary. It is also to be understood that the terminology used herein is for the purpose of describing particular aspects only and is not intended to be limiting.

The detailed description divided into various sections only for the reader's convenience and disclosure found in any section may be combined with that in another section. Titles or subtitles may be used in the specification for the convenience of a reader, which are not intended to influence the scope of the present disclosure.

Definitions

Unless defined otherwise, all technical and scientific terms used herein have the same meaning as commonly understood by one of ordinary skill in the art to which this disclosure belongs. In this specification and in the claims that follow, reference will be made to a number of terms that shall be defined to have the following meanings:

The terminology used herein is for the purpose of describing particular embodiments only and is not intended to be limiting. As used herein, the singular forms "a", "an" and "the" are intended to include the plural forms as well, unless the context clearly indicates otherwise.

"Optional" or "optionally" means that the subsequently described event or circumstance can or cannot occur, and that the description includes instances where the event or circumstance occurs and instances where it does not.

The term "about" when used before a numerical designation, e.g., temperature, time, amount, concentration, and such other, including a range, indicates approximations which may vary by (+) or (−) 10%, 5%,1%, or any subrange or subvalue there between. Preferably, the term "about" when used with regard to a dose amount means that the dose may vary by +1-10%.

The term "near" as used herein is intended to mean located within a short physical distance, or positioned within a short distance of, an object or a point in space. In embodiments, near may be about 0 mm to about 50 mm. In embodiments, near may be between about 0 mm to about 40 mm. In embodiments, near may be between about 0 mm to about 30 mm. In embodiments, near may be between about 0 mm to about 20 mm. In embodiments, near may be between about 0 mm to about 10 mm. In embodiments, near may be less than about 1 mm. In embodiments, near may be less than about 5 mm. In embodiments, near may be less than about 1 cm. In embodiments, near may be less than about 2 cm. In embodiments, near may be less than about 5 cm. In embodiments, near may be about 1 mm. In embodiments, near may be about 2 mm. In embodiments, near may be about 3 mm. In embodiments, near may be about 4 mm. In embodiments, near may be about 5 mm. In embodiments, near may be about 1 cm. In embodiments, near may be about 2 cm. In embodiments, near may be about 3 cm. In embodiments, near may be about 4 cm. The distance may be any value or subrange within the recited ranges, including endpoints.

"Comprising" or "comprises" is intended to mean that the compositions and methods include the recited elements, but not excluding others. "Consisting essentially of" when used to define compositions and methods, shall mean excluding other elements of any essential significance to the combination for the stated purpose. Thus, a composition consisting essentially of the elements as defined herein would not exclude other materials or steps that do not materially affect the basic and novel characteristic(s) of the claimed technology. "Consisting of" shall mean excluding more than trace elements of other ingredients and substantial method steps. Embodiments defined by each of these transition terms are within the scope of this disclosure.

The term "antibody" is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

The term "monoclonal antibody," as used herein, refers to an antibody obtained from a population of substantially homogeneous antibodies, i.e., the individual antibodies comprising the population are identical and/or bind the same epitope, except for possible variant antibodies, e.g., containing naturally occurring mutations or arising during production of a monoclonal antibody preparation, such variants generally being present in minor amounts. In contrast to polyclonal antibody preparations, which typically include different antibodies directed against different determinants (epitopes), each monoclonal antibody of a monoclonal antibody preparation is directed against a single determinant on an antigen. Thus, the modifier "monoclonal" indicates the character of the antibody as being obtained from a substantially homogeneous population of antibodies, and is not to be construed as requiring production of the antibody by any particular method.

The term "fusion partner" as used herein refers to a cell that can be combined with (fused to) a B cell to form a hybridoma. Generally, the fusion partner is a myeloma cell.

The term "outbred" as used herein refers to an animal that is genetically diverse from other animals of the same species. In contrast, an "inbred strain" refers to animals that are genetically identical (or nearly identical) to others in the strain due to inbreeding.

The term "fusion partner" as used herein refers to a fusion partner for creation of a hybridoma. Methods and cells for creation of hybridomas from a variety of species are well known in the art. Generally, fusion partners are myeloma cells. The fusion partner may be any appropriate cell or cell line, for example a myeloma, for creation of a hybridoma. The fusion partner may be derived from a mammalian source. The mammalian source may be a primate, a human, a rat, a mouse, a rodent, or any other species.

Methods

In an aspect, a method for producing an antibody is provided. In an aspect, a method for producing an antibody library is provided. In an aspect, a method for producing a hybridoma is provided. In an aspect, a method for producing a hybridoma library is provided.

In embodiments, the method can include one or more of the following:
(a) injecting one or more animals with an antigen;
(b) harvesting B cells, for example from draining lymph nodes containing B cells, from each animal;
(c) forming a hybridoma between one or more, or each, B cell(s) and a fusion partner(s); and
(d) screening one or more of the hybridomas for binding specificity to the antigen.

In embodiments, at least one, or preferably at least two of the following conditions may apply:
(i) the animals are outbred animals;
(ii) the animals are injected at multiple sites;
(iii) the animals are injected not more than once at a frequency described herein, for example, not less than every two weeks;
(iv) the animals are injected at a frequency as described herein over period of or for between about 6 weeks and about 15 weeks;
(v) multiple adjuvants are used, such that different animals or groups of animals are injected with a different adjuvant compared to each other animal or other group of animals;
(vi) B cells are enriched prior to step (c); and/or
(vii) use of a fusion partner engineered to express both surface and secreted IgG.

In embodiments, at least two of conditions (a)-(d) may apply. In embodiments, at least three of conditions (a)-(d) may apply. In embodiments, four of conditions (a)-(d) may apply. In embodiments, one or more of conditions (a)-(d) may be expressly excluded.

In embodiments, at least three of conditions (i)-(vii) may apply. In embodiments, at least four of conditions (i)-(vii) may apply. In embodiments, at least five of conditions (i)-(vii) may apply. In embodiments, at least six of conditions (i)-(vii) may apply. In embodiments, two of conditions (i)-(vii) may apply. In embodiments, three of conditions (i)-(vii) may apply. In embodiments, four of conditions (i)-(vii) may apply. In embodiments, five of conditions (i)-(vii) may apply. In embodiments, six of conditions (i)-(vii) may apply. In embodiments, seven of conditions (i)-(vii) may apply. In embodiments, one or more of conditions (i)-(vii) may be expressly excluded. In embodiments, condition (i) is expressly excluded. In embodiments, condition (ii) is expressly excluded. In embodiments, condition (iii) is expressly excluded. In embodiments, condition (iv) is expressly excluded. In embodiments, condition (v) is expressly excluded. In embodiments, condition (vi) is expressly excluded. In embodiments, condition (vii) is expressly excluded.

In embodiments, the method can include:
(a) injecting one or more outbred rats with an antigen at multiple sites of each rat;
(b) repeating the injection every 2 weeks for at least 6 weeks;
(c) harvesting immune cells from one or more draining lymph node of each rat;
(d) depleting non-B cells from the immune cells by negative selection to form an enriched B cell sample;
(e) contacting the enriched B cell sample with a plurality of fusion partners to form a hybridoma between each B cell and a fusion partner; and
(f) screening the hybridomas for specificity to the antigen.

In embodiments, the animals may be outbred animals. In embodiments, the animals may be mammals. In embodiments, the animals may be rodents. In embodiments, the rodents may be rabbits, guinea pigs, rats, hamsters, mice, etc. In embodiments, the animals may be rats. In embodiments, the animals may be outbred rats. Examples of outbred rats include, without limitation, Sprague Dawley, Long-Evans, Sentinel, CD® IGS (Charles River), CD® Hairless, Wistar, Wistar Han, and Holtzman rats.

In embodiments, the animals may be mice. In embodiments, the animals may be outbred mice. Examples of outbred mice include, without limitation, Black Swiss, CD-1® IGS (e.g., from Charles River), CF-1, CFW, ORL Sencar, SKH1-Elite, Sentinel, and Diversity Outbred (Jackson Laboratory).

In embodiments, the method may include injecting two or more outbred rats with an antigen at multiple sites of each rat. In embodiments, the method may include injecting three or more outbred rats with an antigen at multiple sites of each rat. In embodiments, the method may include injecting four or more outbred rats with an antigen at multiple sites of each rat. In embodiments, the method may include injecting five or more outbred rats with an antigen at multiple sites of each rat.

In embodiments, the animals may be injected at one or more sites. In embodiments, the animals are injected at multiple sites. In embodiments, the one or more sites may be sites near draining lymph nodes. In embodiments, the one or more sites can include one or more of back, shoulder, intraperitoneal, base of tail, hock, and intravenous.

In embodiments, the amount of antigen injected at each site may be between about 0.1 µg and about 300 µg. In embodiments, the amount of antigen injected at each site may be between 0.1 µg and 200 µg. In embodiments, the amount of antigen injected at each site may be between 0.1 µg and 100 µg. In embodiments, the amount of antigen injected at each site may be between 0.1 µg and 50 µg. In embodiments, the amount of antigen injected at each site may be between 0.1 µg and 25 µg. In embodiments, the amount of antigen injected at each site may be between 0.1 µg and 10 µg. In embodiments, the amount of antigen injected at each site may be between 0.5 µg and 200 µg. In embodiments, the amount of antigen injected at each site may be between 0.5 µg and 100 µg. In embodiments, the amount of antigen injected at each site may be between 0.5 µg and 50 µg. In embodiments, the amount of antigen injected at each site may be between 0.5 µg and 25 µg. In embodiments, the amount of antigen injected at each site may be between 0.5 µg and 10 µg. In embodiments, the amount of antigen injected at each site may be between 1 µg and 300 µg. In embodiments, the amount of antigen injected at each site may be between 1 µg and 200 µg. In embodiments, the amount of antigen injected at each site may be between 1 µg and 100 µg. In embodiments, the amount of antigen injected at each site may be between 1 µg and 50 µg. In embodiments, the amount of antigen injected at each site may be between 1 µg and 25 µg. In embodiments, the amount of antigen injected at each site may be between 1 µg and 10 µg. In embodiments, the amount of antigen injected at each site may be between 5 µg and 300 µg. In embodiments, the amount of antigen injected at each site may be between 5 µg and 200 µg. In embodiments, the amount of antigen injected at each site may be between 5 µg and 100 µg. In embodiments, the amount of antigen injected at each site may be between 5 µg and 50 µg. In embodiments, the amount of antigen injected at each site may be between 5 µg and 25 µg. In embodiments, the amount of antigen injected at each site may be between 5 µg and 10 µg. Amount can be any value or subrange within the recited ranges, including endpoints.

In embodiments, the animals may be injected at one site or at multiple sites on one day or period occurring not less than every one week to four weeks, preferably not less than one week, every 10 days, every two weeks, every three weeks, every 4 weeks, etc. In embodiments, one or more sites can be injected at different times, but each site is not injected more frequently than every one week to every four weeks, preferably not more frequently than every two weeks, etc. In some embodiments, the animals are injected not more than once a week. In some embodiments, the animals are injected not more than once every two weeks.

In embodiments, the animals may receive injections at a frequency described herein for between 6 weeks and 15 weeks. In embodiments, the animals may be injected for between 7 weeks and 15 weeks. In embodiments, the animals may be injected for between 8 weeks and 15 weeks. In embodiments, the animals may be injected for between 9 weeks and 15 weeks. In embodiments, the animals may be injected for between 10 weeks and 15 weeks. In embodiments, the animals may be injected for between 11 weeks and 15 weeks. In embodiments, the animals may be injected for between 12 weeks and 15 weeks. In embodiments, the animals may be injected for between 13 weeks and 15 weeks. In embodiments, the animals may be injected for between 14 weeks and 15 weeks.

In embodiments, the animals may be initially injected in at least one site with a first composition including antigen and adjuvant, then injected at the same or a different site with a second composition comprising antigen once every two weeks. In embodiments, the animals may be injected not more than once every two weeks. In embodiments, the animals may be injected at the same site not more than once every two weeks. In some embodiments, the second composition does not include adjuvant. In some embodiments, the second composition includes adjuvant. In embodiments, the lymph nodes may be harvested from the animals after the second, third, fourth, fifth or sixth injection. The second, third, fourth, fifth or sixth injection can mean the second, third, fourth, fifth of sixth injection into the same site or sites, or the second, third, fourth, fifth or sixth injection into different sites in the animal.

In embodiments, the lymph nodes may be harvested from the animals between, for example, 6 and 10 weeks after the initial injection. In embodiments, the lymph nodes may be harvested from the animals between 6 and 8 weeks after the initial injection. In embodiments, the lymph nodes may be harvested from the animals about 6 weeks after the initial injection. In embodiments, the lymph nodes may be harvested from the animals about 7 weeks after the initial injection. In embodiments, the lymph nodes may be harvested from the animals about 8 weeks after the initial injection. In embodiments, the lymph nodes may be harvested from the animals about 9 weeks after the initial injection. In embodiments, the lymph nodes may be harvested from the animals about 10 weeks after the initial injection.

In embodiments, multiple adjuvants may be used, and each animal (or subset of animals) may be injected with a different adjuvant. In embodiments, the multiple adjuvants may include, for example, complete Freund's adjuvant (CFR), Ribi, and/or TLR (Toll-like receptor) agonist cocktail. In embodiments, an adjuvant may be Freund's Incomplete Adjuvant. In embodiments, an adjuvant may be Titer-Max® (water-in-oil emulsion containing block copolymer CRL-8941, squalene, and a microparticulate stabilizer).

Some adjuvant is mixed to form an emulsion. Without being bound by theory, it is believed that machine-mixing of adjuvant leads to more consistent emulsification and improved results compared to hand-mixing (e.g., with a syringe). In embodiments, the adjuvant may be machine-mixed. In embodiments, the machine-mixed adjuvant may be CFR.

In embodiments, the B cells may be enriched prior to forming a hybridoma. In embodiments, enrichment can include contacting cells harvested from the draining lymph nodes with a binding agent. In embodiments, the B cells may be enriched by negative selection. In embodiments, the binding agent may be specific for a molecule associated with a cell that is not a B cell. In embodiments, the binding agent may be specific for a molecule expressed on the surface of a cell that is not a B cell. In embodiments, the B cells may be enriched by positive selection. In embodiments, the binding agent may be specific for a molecule associated with a B cell. In embodiments, the binding agent may be specific for a molecule expressed on the surface of a B cell (e.g., B cell-specific cell surface receptor).

The binding agent can be any agent that binds to the molecule of interest. In embodiments, the binding agent may be an antibody or portion thereof. In embodiments, the binding agent may be a fusion protein, an aptamer, a ligand, or a receptor.

In embodiments, magnetic separation may be used. In embodiments, magnetic beads may be used. The magnetic beads can be bound to or otherwise associated with the binding agent.

In embodiments, a fusion partner engineered to express both surface and secreted IgG. See, for example, U.S. Pat. No. 7,148,040, which is incorporated herein by reference in its entirety for all of its materials, methods, and teachings. In embodiments, the fusion partner is a Sp2ab fusion partner. Sp2ab myeloma fusion partner is available from Abeome Corporation or Enzo Life Sciences.

In embodiments, screening the hybridomas may include identifying hybridomas that express antibodies that are specific to the antigen. In embodiments, screening the hybridomas may include FACS sorting for expression of IgG antibodies that are specific to the antigen.

In embodiments, the method may increase production of the antibody and/or hybridoma by at least 50% compared to production without the at least two conditions selected from (i)-(vii). In embodiments, the method may increase production of the antibody and/or hybridoma by at least 2-fold compared to production without the at least two conditions selected from (i)-(vii). In embodiments, the method may increase production of the antibody and/or hybridoma by at least 3-fold compared to production without the at least two conditions selected from (i)-(vii). In embodiments, the method may increase production of the antibody and/or hybridoma by at least 4-fold compared to production without the at least two conditions selected from (i)-(vii). In embodiments, the method may increase production of the antibody and/or hybridoma by at least 5-fold compared to production without the at least two conditions selected from (i)-(vii). In embodiments, the method may increase production of the antibody and/or hybridoma by at least 6-fold compared to production without the at least two conditions selected from (i)-(vii). In embodiments, the method may increase production of the antibody and/or hybridoma by at least 7-fold compared to production without the at least two conditions selected from (i)-(vii). In embodiments, the method may increase production of the antibody and/or hybridoma by at least 8-fold compared to production without the at least two conditions selected from (i)-(vii). In embodiments, the method may increase production of the antibody and/or hybridoma by at least 9-fold compared to production without the at least two conditions selected from (i)-(vii). In embodiments, the method may increase production of the antibody and/or hybridoma by at least 10-fold compared to production without the at least two conditions selected from (i)-(vii). In embodiments, the method may increase production of the antibody and/or hybridoma by at least 20-fold compared to production without the at least two conditions selected from (i)-(vii). In embodiments, the method may increase production of the antibody and/or hybridoma by at least 30-fold compared to production without the at least two conditions selected from (i)-(vii). In embodiments, the method may increase production of the antibody and/or hybridoma by at least 40-fold compared to production without the at least two conditions selected from (i)-(vii). In embodiments, the method may increase production of the antibody and/or hybridoma by at least 50-fold compared to production without the at least two conditions selected from (i)-(vii). In embodiments, the method may increase production of the antibody and/or hybridoma by at least 60-fold compared to production without the at least two conditions selected from (i)-(vii). In embodiments, the method may increase production of the antibody and/or hybridoma by at least 70-fold compared to production without the at least two conditions selected from (i)-(vii). In embodiments, the method may increase production of the antibody and/or hybridoma by at least 80-fold compared to production without the at least two conditions selected from (i)-(vii). In embodiments, the method may increase production of the antibody and/or hybridoma by at least 90-fold compared to production without the at least two conditions selected from (i)-(vii). In embodiments, the method may increase production of the antibody and/or hybridoma by over 100-fold compared to production without the at least two conditions selected from (i)-(vii).

In embodiments, deriving hybridoma clones in accordance with a method described herein, e.g., from lymph nodes, produces up to about 15 times more hybridoma clones than when deriving the hybridoma clones from spleen tissue, e.g., in an otherwise similar or the same method. See e.g., the methods compared in Example 4. In embodiments, deriving hybridoma clones in accordance with a method described herein, e.g., from lymph nodes, produces about 2 times to about 15 times more hybridoma clones than when deriving the hybridoma clones from spleen tissue, e.g., in an otherwise similar or the same method. In embodiments, deriving hybridoma clones in accordance with a method described herein, e.g., from lymph nodes, produces about 2, about 3, about 4, about 5, about 6, about 7, about 8, about 9, about 10, about 11, about 12, about 13, about 14, or about 15 times more hybridoma clones than when deriving the hybridoma clones from spleen tissue, e.g., in an otherwise similar or the same method. Amounts may be any value or subrange within the recited ranges, including endpoints. In some embodiments, the lymph nodes are from a rat, e.g., a wild type rat or a transgenic rat.

In embodiments, machine mixing an adjuvant may result in twice to four times the antigen-specific serum IgG titers than syringe mixing the adjuvant. In embodiments, machine mixing an adjuvant may result in twice the antigen-specific serum IgG titers than syringe mixing the adjuvant. In embodiments, machine mixing an adjuvant may result in three times the antigen-specific serum IgG titers than syringe mixing the adjuvant. In embodiments, machine mixing an adjuvant may result in four times the antigen-specific serum IgG titers than syringe mixing the adjuvant.

In embodiments, the antigen-specific IgG titer value when Complete Freund's Adjuvant (CFA) is used may be 10 times or more compared to when a different adjuvant, such as Ribi adjuvant or TLR agonist cocktail adjuvant, is used. In embodiments, the antigen-specific IgG titer value when CFA is used may be 2 times to 50 times higher. In embodiments, the antigen-specific IgG titer value when CFA is used may be 2 times to 25 times higher. In embodiments, the antigen-specific IgG titer value when CFA is used may be 2 times to 20 times higher. In embodiments, the antigen-specific IgG titer value when CFA is used may be 2 times to 15 times higher. In embodiments, the antigen-specific IgG titer value when CFA is used may be 2 times to 10 times higher. In embodiments, the antigen-specific IgG titer value when CFA is used may be 10 times to 50 times higher. In embodiments, the antigen-specific IgG titer value when CFA is used may be 10 times to 25 times higher. In embodiments, the antigen-specific IgG titer value when CFA is used may be 10 times to 20 times higher. Amounts may be any value or subrange within the recited ranges, including endpoints.

In embodiments, the antigen-specific IgG titer value when Ribi adjuvant is used may be 10 times or more higher compared to when a different adjuvant, e.g. TLR agonist cocktail adjuvant, is used. In embodiments, the antigen-specific IgG titer value when Ribi adjuvant is used may be 2 times to 50 times higher. In embodiments, the antigen-specific IgG titer value when Ribi adjuvant is used may be 2 times to 25 times higher. In embodiments, the antigen-specific IgG titer value when Ribi adjuvant is used may be 2 times to 20 times higher. In embodiments, the antigen-specific IgG titer value when Ribi adjuvant is used may be 2 times to 15 times higher. In embodiments, the antigen-specific IgG titer value when Ribi adjuvant is used may be 2 times to 10 times higher. In embodiments, the antigen-specific IgG titer value when Ribi adjuvant is used may be 10 times to 50 times higher. In embodiments, the antigen-specific IgG titer value when Ribi adjuvant is used may be 10 times to 25 times higher. In embodiments, the antigen-specific IgG titer value when Ribi adjuvant is used may be 10 times to 20 times higher. Amounts may be any value or subrange within the recited ranges, including endpoints.

In embodiments, the antigen-specific IgG titer value when TLR agonist cocktail adjuvant is used may be 10 times or more higher compared to when a different adjuvant, e.g. Ribi adjuvant or CFA, is used. In embodiments, the antigen-specific IgG titer value when TLR agonist cocktail adjuvant is used may be 2 times to 50 times higher. In embodiments, the antigen-specific IgG titer value when TLR agonist cocktail adjuvant is used may be 2 times to 25 times higher. In embodiments, the antigen-specific IgG titer value when TLR agonist cocktail adjuvant is used may be 2 times to 20 times higher. In embodiments, the antigen-specific IgG titer value when TLR agonist cocktail adjuvant is used may be 2 times to 15 times higher. In embodiments, the antigen-specific IgG titer value when TLR agonist cocktail adjuvant is used may be 2 times to 10 times higher. In embodiments, the antigen-specific IgG titer value when TLR agonist cocktail adjuvant is used may be 10 times to 50 times higher. In embodiments, the antigen-specific IgG titer value when TLR agonist cocktail adjuvant is used may be 10 times to 25 times higher. In embodiments, the antigen-specific IgG titer value when TLR agonist cocktail adjuvant is used may be 10 times to 20 times higher. Amounts may be any value or subrange within the recited ranges, including endpoints.

In embodiments, use of IgM-depleted enriched LN B-cells may produce about 10 times to about 100 times more IgG-expressing hybridoma clones than when enriched LN B-cells are used. In embodiments, use of IgM-depleted enriched LN B-cells produce about 10 times to about 75 times more IgG-expressing hybridoma clones. Amounts may be any value or subrange within the recited ranges, including endpoints. In embodiments, use of IgM-depleted enriched LN B-cells produce about 10 times to about 50 times more IgG-expressing hybridoma clones. In embodiments, use of IgM-depleted enriched LN B-cells produce about 10 times to about 25 times more IgG-expressing hybridoma clones. In embodiments, use of IgM-depleted enriched LN B-cells produce about 25 times to about 100 times more IgG-expressing hybridoma clones. In embodiments, use of IgM-depleted enriched LN B-cells produce about 50 times to about 100 times more IgG-expressing hybridoma clones. In embodiments, use of IgM-depleted enriched LN B-cells produce about 10 times to about 75 times more IgG-expressing hybridoma clones. Amounts may be any value or subrange within the recited ranges, including endpoints.

In an aspect, provided herein is an antibody library. In embodiments, the antibody library is prepared using a method as described herein.

In an aspect, provided herein is an antibody. In embodiments, the antibody is prepared using a method as described herein.

In an aspect, provided herein is a hybridoma library. In embodiments, the hybridoma library is prepared using a method as described herein.

In an aspect, provided herein is a kit for preparation of a hybridoma library or an antibody library as described herein. In embodiments, the kit includes at least one adjuvant. In embodiments, the kit includes at least two different adjuvants. In embodiments, the kit includes a reagent for isolating, separating, or enriching B cells (e.g., from other cells in the lymph node). In embodiments, the kit includes beads (microbeads) that interact with the at least one reagent. In embodiments, the kit includes a column that interacts with the at least one reagent. In embodiments, the kit includes a fusion partner for creation of a hybridoma.

In embodiments, the adjuvant is CFR, Ribi, and/or TLR agonist cocktail. In embodiments, the at least one reagent for isolating, separating, or enriching B cells includes an antibody specific for B cells (e.g., murine or rat B cells). In embodiments, the at least one reagent for isolating B cells includes an antibody that recognizes cells other than B cells. In embodiments, the antibody is labeled. In embodiments, the label binds a second molecule. In embodiments, the second molecule is attached to the beads or column. In embodiments, the label is biotin and the second molecule is streptavidin. In embodiments, the beads are magnetic beads. In embodiments, the column is a magnetic column. In embodiments, the fusion partner is engineered to express both surface and secreted IgG.

Some embodiments relate to devices, apparatus, compositions, formulations, cells, antibodies, adjuvants, hybridomas, populations or pluralities of any of the same, and combinations of any of the same, that are used, produced or result in conducting any of the methods or parts of the methods described herein.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

EXAMPLES

One skilled in the art would understand that descriptions of making and using the particles described herein is for the sole purpose of illustration, and that the present disclosure is not limited by this illustration.

Example 1. Inbred Vs. Outbred Animals

Sprague Dawley rats or Balb/c mice (Charles River) were immunized with 100 µg target A protein (Genentech) mixed with Complete Freund's Adjuvant (BD Biosciences) or Ribi adjuvant (Sigma-Aldrich) subcutaneously at the base of tail, followed by boosts with 50 µg protein mixed with Incomplete Freund's Adjuvant (BD Biosciences) or sterile PBS at rotating sites (i.p., both hocks, or base of tail) every two weeks. Serum was taken following five doses and tested by ELISA against immunizing protein.

FIG. 1A shows that IgG-expression titers in SD rats are higher than those in Balb/c mice. The antigen-specific IgG titer value is the dilution factor resulting in a signal of half of the maximum signal. The target homology is included to show that the titer differences are likely not based on differences in antigen tolerance.

Sprague Dawley rats (Charles River) or C57BL/6 knockout mice (Genentech) were immunized with 50 µg target B protein (Genentech) mixed with Complete Freund's Adjuvant (BD Biosciences), Ribi adjuvant (Sigma-Aldrich), or TLR agonist cocktail (as described in FIG. 3C) subcutaneously at the base of tail, followed by boosts with 25 µg protein mixed with Incomplete Freund's Adjuvant (Sigma-Aldrich) or sterile PBS at rotating sites (i.p., both hocks, or base of tail) every two weeks. Serum was taken following six doses and tested by ELISA against immunizing protein.

Figure 1B:
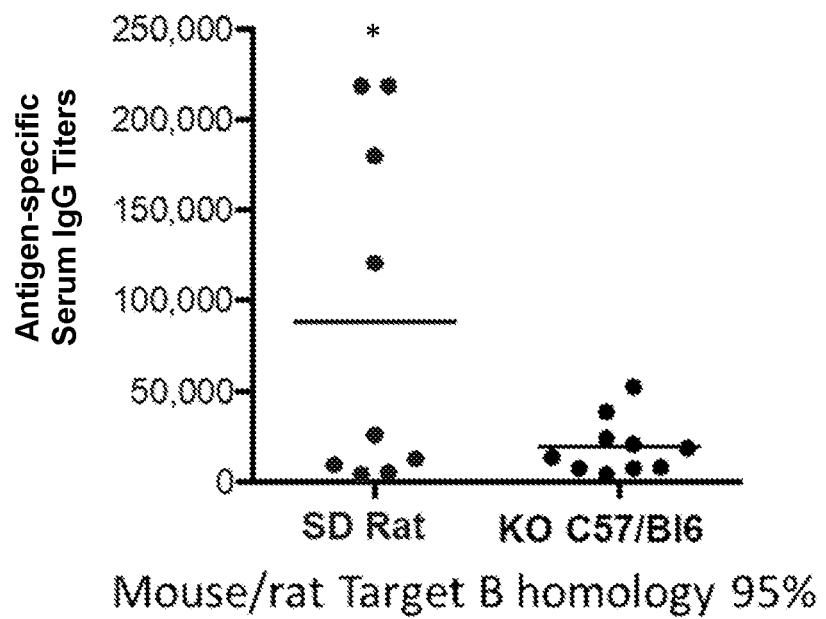
FIG. 1B shows the difference in IgG serum titers when using Sprague Dawley rats (SD Rat) versus C57 back 6 (C57/B16) mice for antibody production for antigen B (Target B). *$p<0.05$ versus mouse.

FIG. 1B shows that IgG-expression titers in SD rats are higher than those in C57BL/6 mice. The antigen-specific IgG titer value is the dilution factor resulting in a signal reaching half of the maximum signal. The target homology is included to show that the titer differences are likely not based on differences in antigen tolerance.

Example 2. Single Vs. Multiple Injection Sites

Figure 2A:
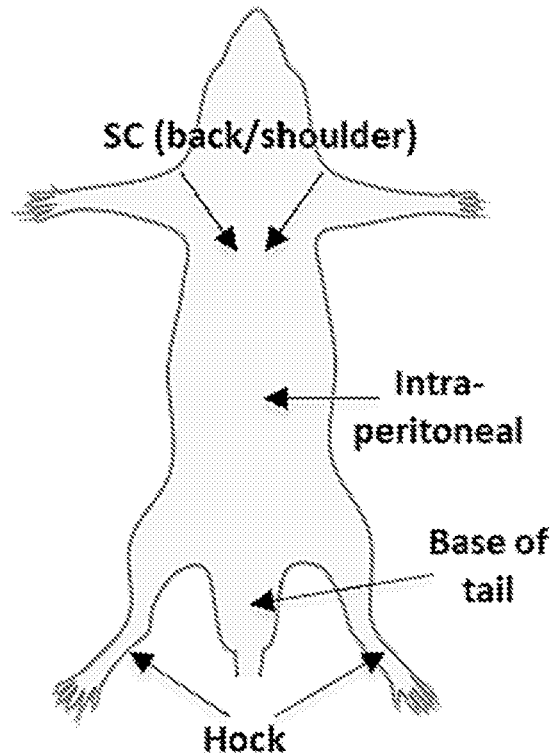
FIG. 2A is a representation of a rat, showing examples of antigen injection sites for immunization.

FIG. 2A shows the location of multiple injection sites for immunization. Base of tail, shoulder, and hock injections are administered subcutaneously (s.c.), with antigen-specific B-cells likely to drain to the inguinal and iliac, axillary and brachial, and popliteal lymph nodes, respectively. Intraperitoneal (i.p.) injections are administered into the peritoneal cavity with antigen-specific B-cells likely to drain to the mesenteric lymph nodes as well as the spleen.

Transgenic rats (Open Monoclonal Technology) were immunized with 20 µg target C protein or target D protein (Genentech) mixed with Ribi adjuvant (Sigma-Aldrich) weekly either only i.p. or divided among multiple sites as shown in FIG. 2A, rotating every two weeks. Serum was taken following five weeks of injections and tested by ELISA against immunizing protein.

Figure 2B:
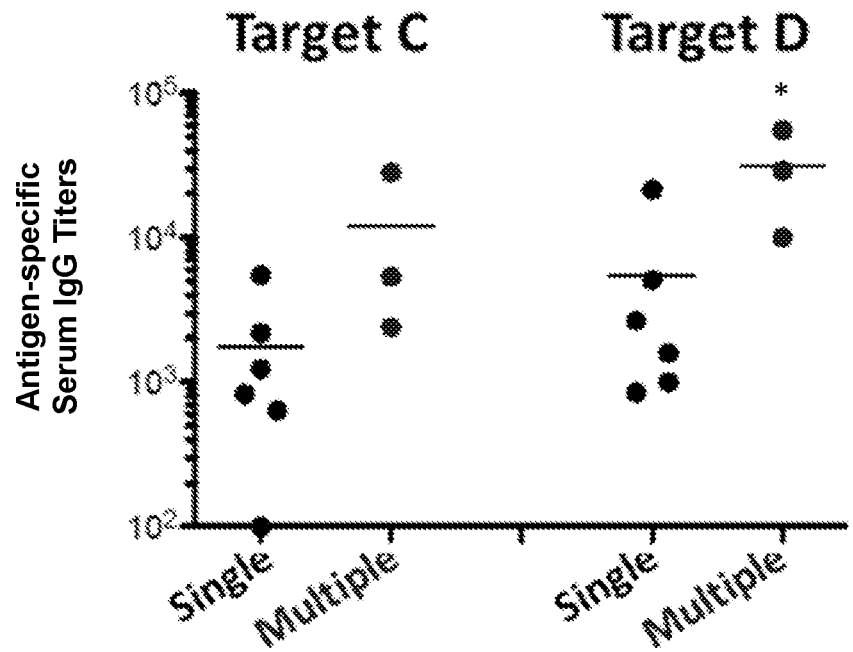
FIG. 2B shows antigen-specific antibody titers against antigens C (Target C) and D (Target D) using single site injection or multiple site injections of each animal. *$p<0.05$ versus single injection.

FIG. 2B shows that antigen-specific titers after single-site immunization are lower than after multiple-site immunizations. The antigen-specific IgG titer value is the dilution factor resulting in a signal reaching half of the maximum signal.

Example 3. Twice-Per-Week Vs. Once-Per-Two-Weeks Dosing

Figure 3A:
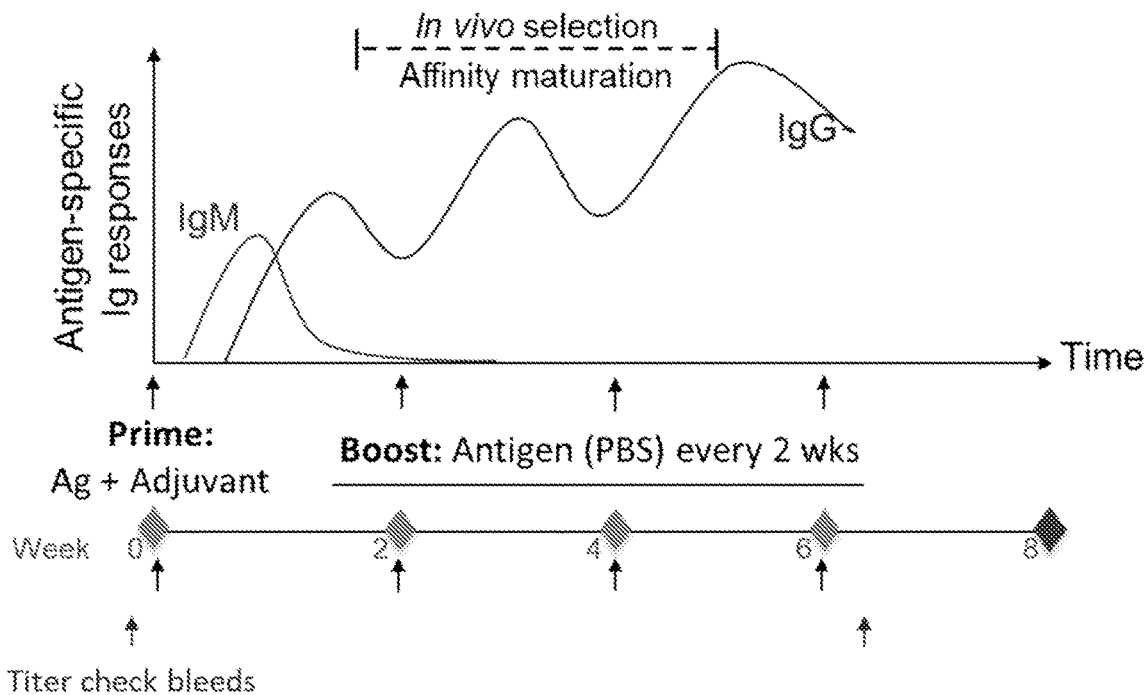
FIG. 3A shows an example protocol for injection of the animals with antigen, and expected antigen-specific Ig (IgM and IgG) response based on that protocol. Background serum titers are performed prior to first injection ("titer check bleeds"). Animals are injected with antigen in adjuvant at week 0 ("prime"), then injected with antigen in PBS once every two weeks until week 6 ("boost"). Serum titers are measured again after the final injection.

FIG. 3A shows a strategy of dosing once per two weeks. A generic illustration of expected changes in antigen-specific immune response upon immunization with antigen; actual data is not shown. Animals are injected with protein combined with adjuvant (Freund's, Ribi, or TLR agonist cocktail as described in Example 3) in multiple sites at week 0, which stimulates the primary immune response as indicated by an increase in serum IgM levels. Animals are then boosted once every two weeks, typically with a lower amount of antigen diluted in sterile PBS with no adjuvant. This stimulates the secondary immune response, leading to an increase in serum IgG levels and the development of germinal centers for B-cell selection and affinity maturation against the target. Serum is taken at multiple timepoints to evaluate the progression of the antigen-specific immune response.

C57BL/6 knockout mice (Genentech) were immunized i.p. with 2 µg target E protein (Genentech) mixed with Ribi adjuvant (Sigma-Aldrich) twice per week (every 3-4 days) or i.p. with 100 µg target E protein mixed with Ribi adjuvant, followed by i.p. boosts with 50 µg target E protein mixed with Ribi adjuvant or diluted in sterile PBS every two weeks. Serum was taken following eight or nine weeks of dosing and tested by ELISA against immunizing protein.

Figure 3B:
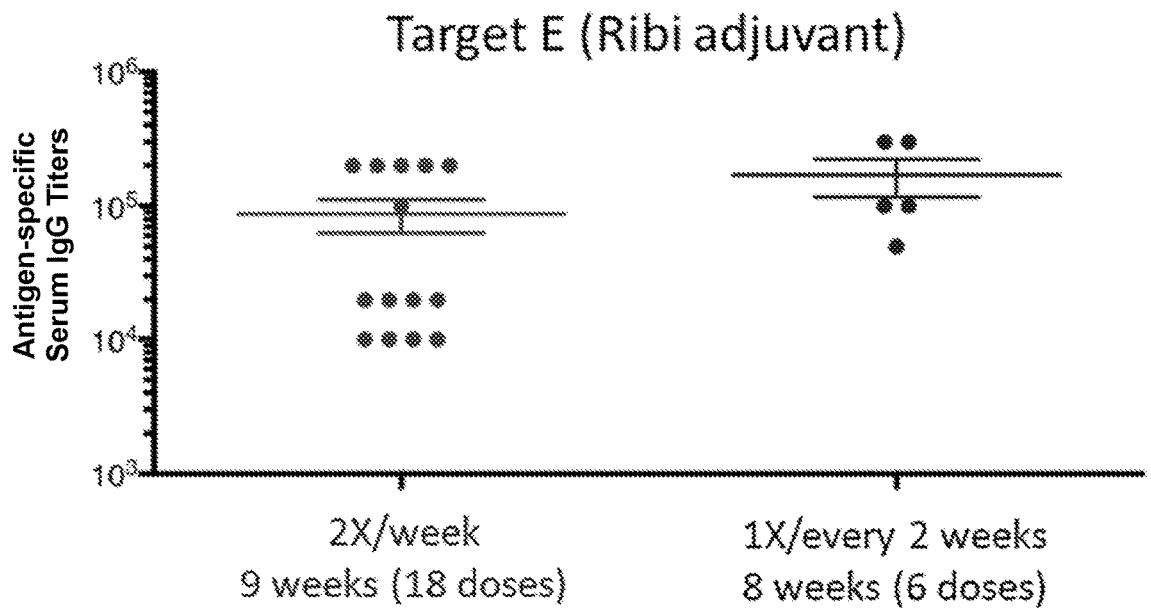
FIGS. 3B and 3C compare the standard antigen injection protocol (twice-a-week injection for 9 weeks) with the improved protocol shown in FIG. 3A. The improved protocol increases antibody titers against antigen E (Target E) when administered in Ribi adjuvant (FIG. 3B) or TLR adjuvant (FIG. 3C).

FIG. 3B shows that, surprisingly, antigen-specific titers from rats dosed twice per week were lower than those dosed once every two weeks using Ribi adjuvant. The antigen-specific IgG titer value is the dilution factor resulting in a signal reaching half of the maximum signal.

C57BL/6 knockout mice (Genentech) were immunized i.p. with 2 µg target E protein (Genentech) mixed with a combination of TLR agonists: 50 µg MPL (Sigma-Aldrich), 20 µg R848 (Invivogen), 10 µg PolyI:C (Invivogen), and 10 µg CpG (Invivogen) twice per week (every 3-4 days) or i.p. with 100 µg target E protein mixed with TLR agonist cocktail adjuvant, followed by i.p. boosts with 50 µg target E protein mixed with Ribi adjuvant (Sigma-Aldrich) or diluted in sterile PBS every two weeks. Serum was taken following eight or nine weeks of dosing and tested by ELISA against immunizing protein.

Figure 3C:
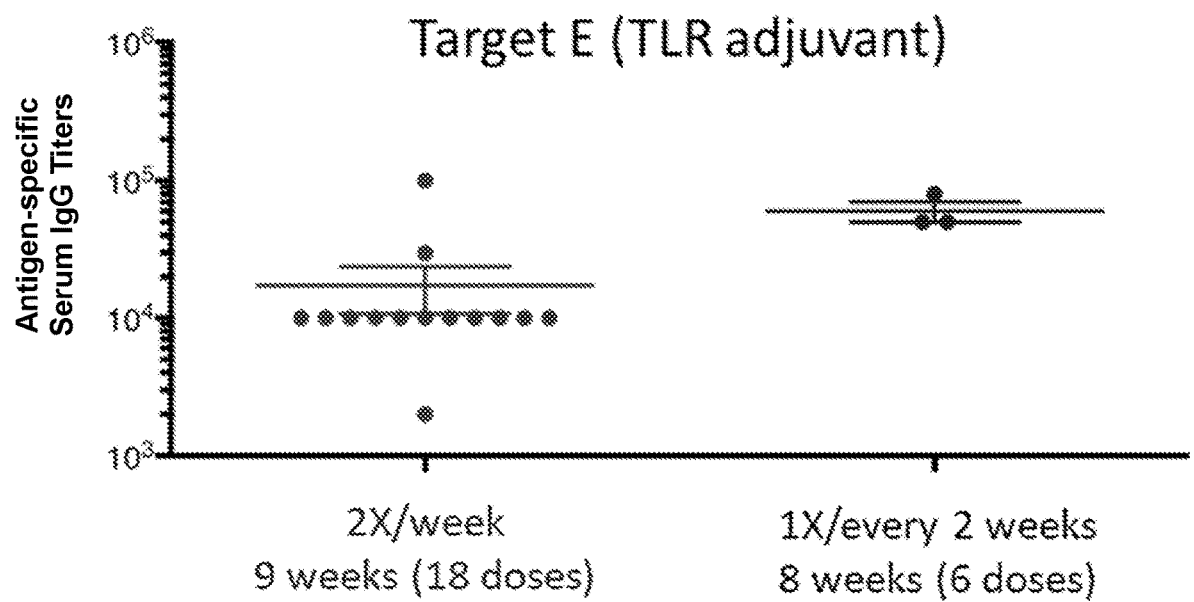

FIG. 3C shows antigen-specific titers from rats dosed twice per week were lower than those dosed once every two weeks using TLR agonist adjuvant cocktail. The antigen-specific IgG titer value is the dilution factor resulting in a signal reaching half of the maximum signal.

Example 4. Lymph Nodes Vs. Spleen as B-Cell Source

Figure 4A:
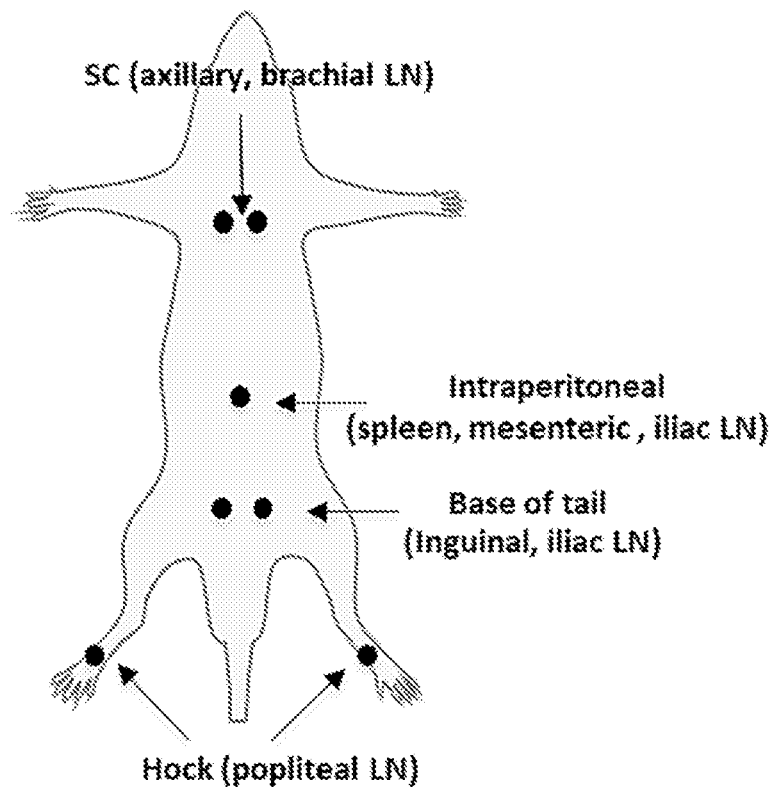
FIG. 4A is a representation of a rat, showing examples of draining lymph nodes near the injection sites.

FIG. 4A shows the location of draining lymph nodes near multiple site injection locations. Multiple lymph nodes, including the inguinal, iliac, axillary, brachial, mesenteric, and popliteal lymph nodes are harvested and pooled as potential antigen-specific B-cell sources from animals injected with antigen in multiple sites as described in FIG. 2A.

Transgenic rats (Open Monoclonal Technology) were immunized with 200 µg target D protein (Genentech) mixed with Complete Freund's Adjuvant (BD Biosciences) s.c. at the base of tail, followed by boosts of 100 µg target D protein mixed with Incomplete Freund's Adjuvant (BD Biosciences) divided among multiple sites as shown in FIG. 2A, rotating every two weeks, or 10 µg target D protein mixed with Ribi adjuvant (Sigma-Aldrich) or TLR agonist cocktail (as described in Example 3) twice per week (every 3-4 days). Spleen or multiple lymph nodes were harvested three days after the last immunization, approximately seven weeks after the start of immunizations. B-cells from these rats were purified from lymphocytes using magnetic separation (Miltenyi Biotec) as described in Example 6, and 45 million cells from resulting B-cell population were fused with P3X63-Ag8U.1 mouse myeloma cells (American Type Culture Collection) via electrofusion (Harvard Apparatus). Fused cells were incubated at 37° C., 7% $CO_2$, overnight in Medium C (StemCell Technologies), before resuspension in semi-solid Medium D (StemCell Technologies) with anti-rat IgG-FITC (Sigma-Aldrich) and plating into Omniwell trays (Thermo Fisher Scientific). Seven days after plating, fluorescent colonies were selected and transferred into 96-well culture plates (BD Biosciences) containing Medium E (StemCell Technologies) using a Clonepix FL (Molecular Devices). Supernatants were screened by ELISA against target D protein seven days after colony picking.

Figure 4B:
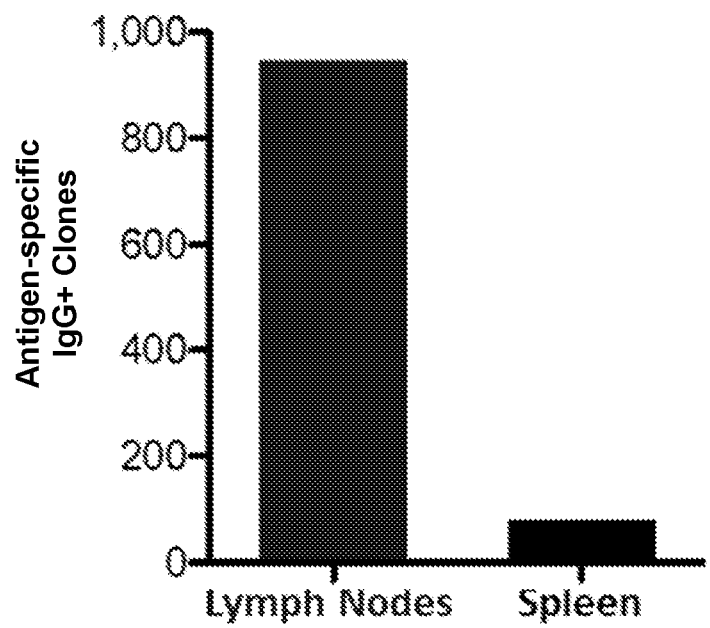
FIG. 4B shows the difference in number of antigen (Target D)-specific hybridoma clones when cells were harvested from the lymph nodes compared to the spleen. The increase in IgG+ hybridomas from LNs is applicable to rats (as opposed to mice).

FIG. 4B shows that the number of antigen specific hybridoma clones derived from lymph nodes is significantly higher than from spleen. As shown in FIG. 4B, deriving hybridoma clones from spleen produces up to about 10 times less hybridoma clones than when deriving the hybridoma clones from lymph nodes. Surprisingly, using the methods described herein, it is possible to obtain as much as 10 times or more of the number of antigen specific IgG+ clones when derived from lymph nodes rather than spleen.

Example 5. Use of Multiple Adjuvants in Parallel

Figure 5A:
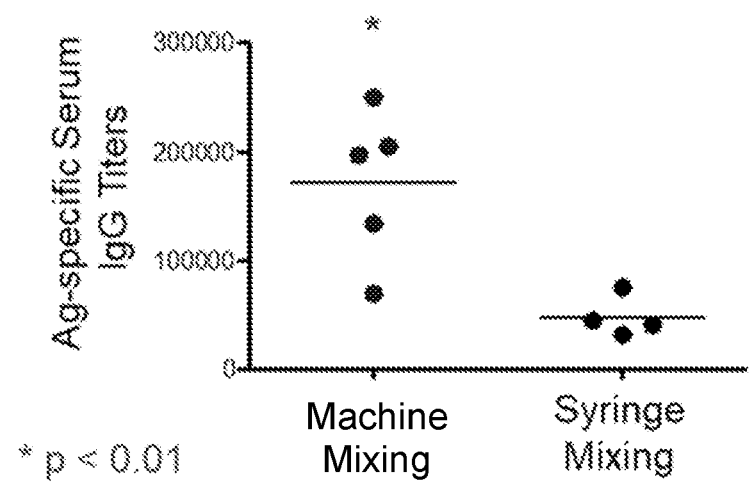
FIG. 5A shows antigen-specific IgG serum titers against antigen J. CFA adjuvant was used, and was either mixed by a machine or by hand ("syringe mixing"). *p<0.01 versus syringe mixing.

To determine whether machine mixing of CFR has an effect on resulting titers, CFR was mixed with antigen using a machine (Omni Mixer, Omni Inc.) or by hand using a syringe. Rats were injected with the adjuvant compositions and antigen-specific antibody titers determined as described herein. Results are shown in FIG. 5A. As seen in FIG. 5A, machine mixing produces significantly more antigen-specific serum IgG titers than syringe mixing. The machine mixed sample showed approximately twice the antigen-specific serum IgG titers than the syringe mixed sample.

Transgenic rats (Open Monoclonal Technology) were immunized twice per week with 20 µg target F protein (Genentech) mixed with Ribi adjuvant (Sigma-Aldrich), or with TLR agonist cocktail adjuvant as described in Example 3, divided among multiple sites as shown in FIG. 2A, or with 150 µg target F protein mixed with Complete Freund's Adjuvant (BD Biosciences) injected at base of tail, followed by boosts of 50 µg target F protein mixed with Incomplete Freund's Adjuvant (BD Biosciences) or 10 µg CpG (Invivogen), divided among multiple sites as shown in FIG. 2A every two weeks. Serum was taken following 10 weeks of dosing and tested by ELISA against immunizing protein.

Figure 5B:
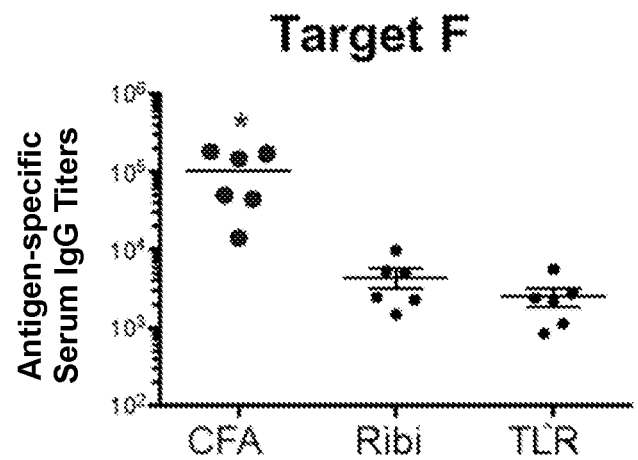
FIGS. 5B and 5C show antigen-specific IgG serum titers against antigen F ("Target F," FIG. 5B) or antigen G ("Target G," FIG. 5C) when CFA, Ribi, or TLR was used as adjuvant. *p<0.05 versus other conditions.

FIG. 5B shows antigen-specific titers from animals immunized with different adjuvants. The antigen-specific IgG titer value is the dilution factor resulting in a signal of half of the maximum signal. As shown in FIG. 5B, Complete Freund's Adjuvant (CFA) has a significantly higher antigen-specific IgG titer value than Ribi adjuvant or TLR agonist cocktail adjuvant, by more than a power of 10 for this antigen.

Transgenic rats (Open Monoclonal Technology) were immunized weekly with 20 µg target G protein (Genentech) mixed with Ribi adjuvant (Sigma-Aldrich), or with TLR agonist cocktail adjuvant as described in Example 3, divided among multiple sites as shown in FIG. 2A. Serum was taken following six weeks of dosing and tested by ELISA against immunizing protein.

Figure 5C:
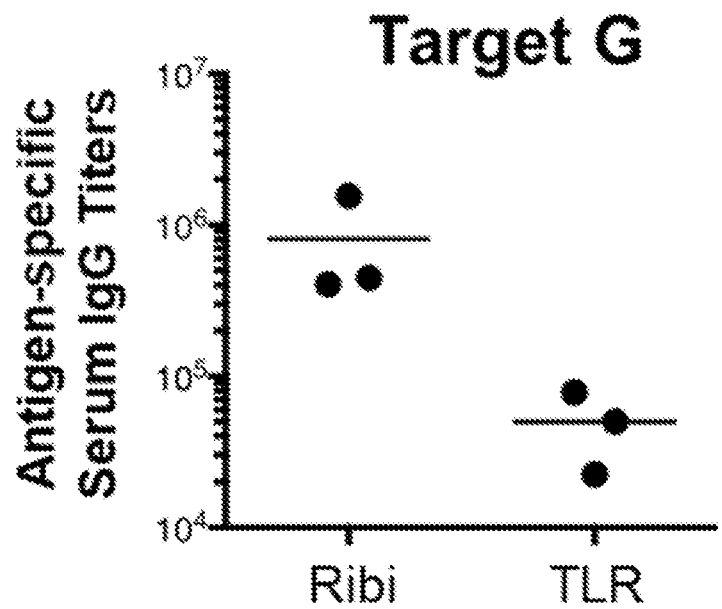

FIG. 5C shows antigen-specific titers from animals immunized with different adjuvants. The antigen-specific IgG titer value is the dilution factor resulting in a signal of half of the maximum signal. As shown in FIG. 5C, Ribi adjuvant has a higher antigen-specific IgG titer value than TLR agonist cocktail adjuvant, by approximately a power of 10 for this antigen.

Example 6. B-Cell Enrichment and IgM Depletion Through Negative Selection

Transgenic rats (Open Monoclonal Technology) were immunized with 10 µg target D protein (Genentech) mixed with Ribi adjuvant (Sigma-Aldrich) s.c. at the base of tail, followed by boosts of 10 µg target D protein mixed with Ribi adjuvant (Sigma-Aldrich) divided among multiple sites as shown in FIG. 2A twice per week (every 3-4 days). Multiple lymph nodes were harvested three days after the last immunization, approximately seven weeks after the start of immunizations. Lymphocytes were incubated with anti-rat CD4 (BD Biosciences), anti-rat CD8a (BD Biosciences), anti-rat CD11b/c (BD Biosciences), anti-rat CD161a (BD Biosciences), and anti-rat granulocytes (eBioscience) biotin-conjugated antibodies, washed, then incubated with streptavidin-coated magnetic beads (Miltenyi Biotec) and run over a magnetic column (Miltenyi Biotec) to capture the unlabeled population. The resulting enriched B-cell population was then taken for fusion or passed through an additional depletion step. Cells were labeled with anti-rat IgM-biotin (BD Biosciences) washed, then incubated with streptavidin-coated magnetic beads (Miltenyi Biotec) and run over a magnetic column (Miltenyi Biotec) to capture the unlabeled population. Cells from each group were fused with P3X63-Ag8U.1 mouse myeloma cells (American Type Culture Collection) via electrofusion (Harvard Apparatus). Fused cells were incubated at 37° C., 7% $CO_2$, overnight in Medium C (StemCell Technologies), before resuspension in semi-solid Medium D (StemCell Technologies) with anti-rat IgG-FITC (Sigma-Aldrich) and plating into Omniwell trays (Thermo Fisher Scientific). Seven days after plating, fluorescent colonies were selected and transferred into 96-well culture plates (BD Biosciences) containing Medium E (StemCell Technologies) using a Clonepix FL (Molecular Devices). Supernatants were screened by ELISA against target D protein seven days after colony picking. IgG-positive clone numbers shown are normalized for a fusion of 45 million B-cells.

Figure 6:
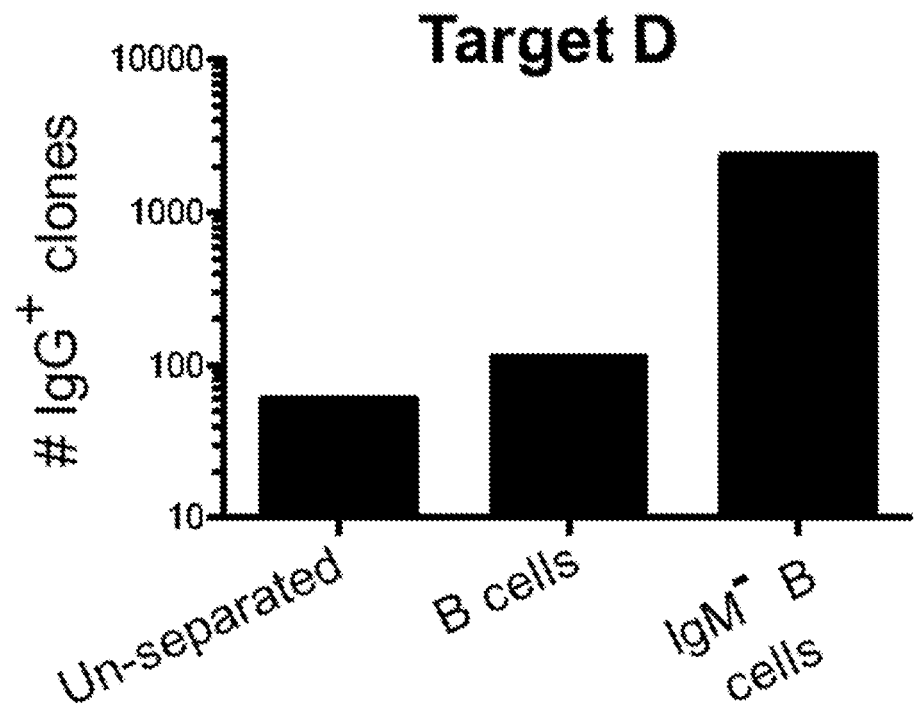
FIG. 6 shows the number of IgG-positive hybridoma clones derived from whole lymph nodes ("un-separated"), cells remaining after depletion of non-B cells of the lymph-harvested cells ("B cells"), or cells remaining after depletion of IgM-positive B cells from the enriched B cells.

FIG. 6 shows the number of IgG-expressing hybridoma clones derived from whole lymph nodes, enriched LN B-cells, and IgM-depleted enriched LN B-cells. As shown in FIG. 6, IgM-depleted enriched LNB-cells produced the highest number of IgG-expressing hybridoma clones, followed by enriched LN B-cells and unseparated whole lymph nodes. Surprisingly, using the methods described here, IgM-depleted enriched LN B-cells can produce about 10 times to about 100 times more IgG-expressing hybridoma clones than enriched LN B-cells.

Example 7. SP2ab Vs. PU1 Antigen-Specific Hybridoma Generation

Figure 7A:
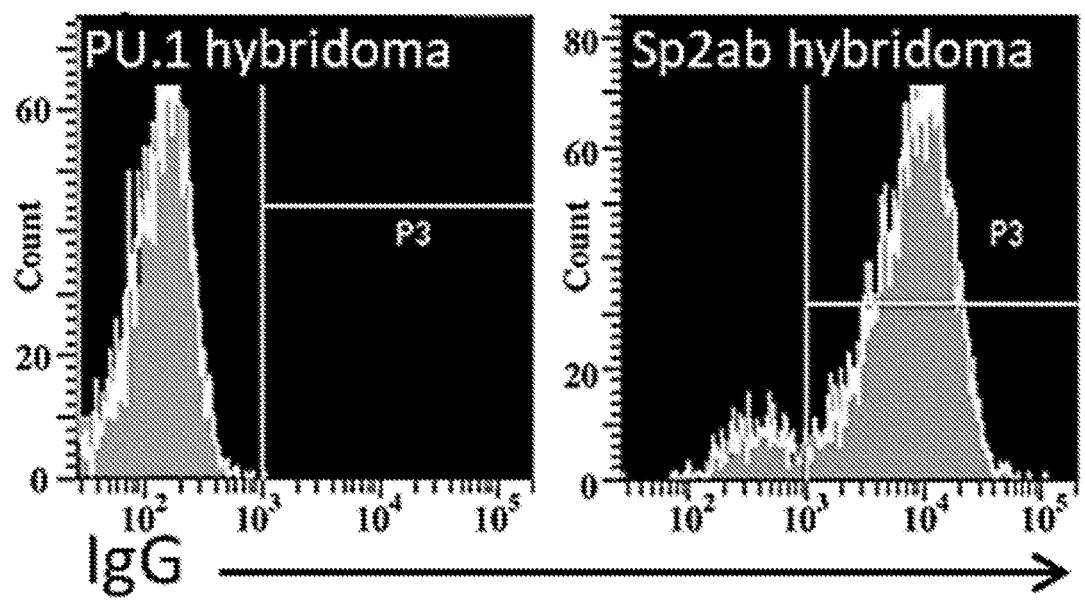
FIG. 7A shows the number of antigen H ("Target H")-specific hybridomas generated using either P3X63AgU.1 ("PU.1"; ATCC) or Sp2ab (Enzo Abeome DiSH) as the fusion partner.

FIG. 7A: Control hybridoma (left) is compared using flow cytometry to the line transformed with Igα and Igβ after labeling with APC GAM Ig (right). Histograms indicate live-cell populations. Hybridomas were produced as described in Harlow and Lane (1988) and grown in culture medium supplemented with HAT (Sigma-Aldrich). Sorted cells were grown in culture medium supplemented with hypoxanthine and thymidine (Sigma-Aldrich). Cells were washed, and then stained with allophycocyanin-conjugated Goat Anti-Mouse Ig H+L (Invitrogen). Cells were again washed, and resuspended with IMDM containing 20% FBS (Atlanta Biological Laboratories). Non-viable cells were differentiated from live cells using propidium iodide or 7-amino actinomycin D (both Invitrogen). Modified from: Price, et al. *J. Immunol Methods.* 2009 Mar. 31; 343(1): 28-41.

Figure 7B:
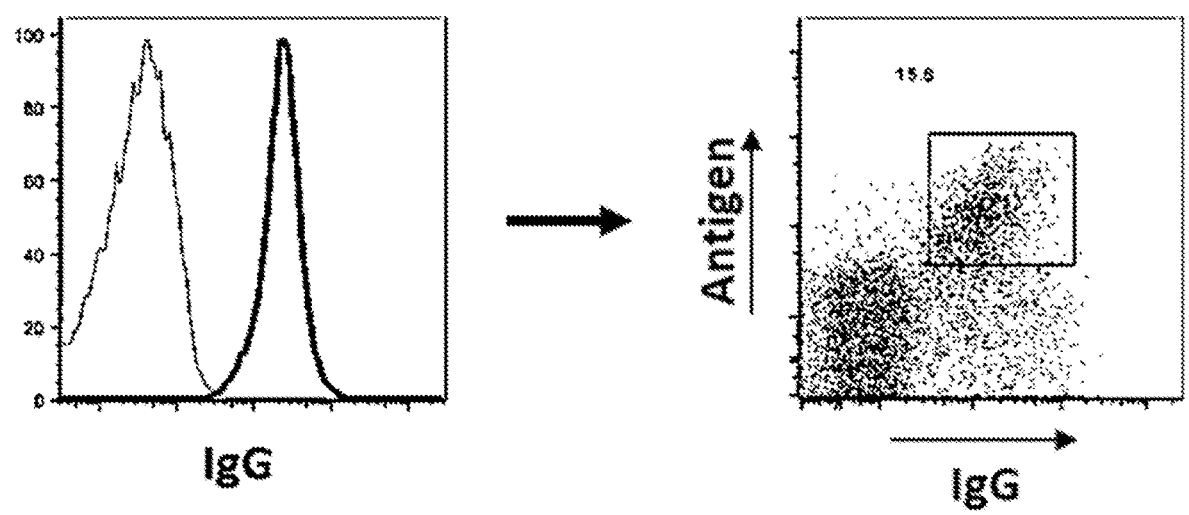
FIG. 7B shows FACS sort profile of SP2ab hybridomas.

FIG. 7B shows a FACS sort profile of SP2ab hybridomas. IgM negative B-cells from immunized rats were purified from lymphocytes using magnetic separation (Miltenyi Biotec) as described in Example 6 and fused with SP2ab mouse myeloma cells (Enzo Life Sciences) via electrofusion (Harvard Apparatus). Fused cells were incubated at 37° C., 7% $CO_2$, overnight in Medium C (StemCell Technologies), before plating into 6-well plates containing Medium E (StemCell Technologies) supplemented with 1×HAT (Sigma-Aldrich) and incubated at 37° C., 7% $CO_2$ for three days. Cells were collected and stained with allophycocyanin-labeled anti-rat IgG (Jackson Immunoresearch) and phycoerythrin-labeled target protein (Genentech). The hybridoma cell population expresses IgG (left histogram) and $IgG^+Ag^+$ cells were identified and sorted using a FACSAria Fusion sorter (BD Biosciences) (right dot plot).

Transgenic rats (Open Monoclonal Technology) were immunized with 100 target H protein (Biosearch Technologies) mixed with Complete Freund's Adjuvant (BD Biosciences) at base of tail, followed by boosts of 50 µg target H protein mixed with Incomplete Freund's Adjuvant (BD Biosciences) i.p every two weeks. C57BL/6 knockout mice (Genentech) were immunized with 2 µg target I protein (Genentech) mixed with TLR agonist cocktail (as described in Example 3) at multiple sites (i.p. and both hocks) twice per week (every 3-4 days). IgM negative B-cells from immunized animals were purified from lymphocytes using magnetic separation (Miltenyi Biotec) (using a kit for mice, or as described in Example 6 for rats) and were fused with P3X63-Ag8U.1 mouse myeloma cells (American Type Culture Collection) via electrofusion (Harvard Apparatus). Fused cells were incubated at 37° C., 7% $CO_2$, overnight in Medium C (StemCell Technologies), before resuspension in semi-solid Medium D (StemCell Technologies) with anti-species IgG-FITC (Jackson Immunoresearch) and plating into Omniwell trays (Thermo Fisher Scientific). Seven days after plating, fluorescent colonies were selected and transferred into 96-well plates containing Medium E (StemCell Technologies) using a Clonepix FL (Molecular Devices). Supernatants were screened by ELISA against immunization protein seven days after picking.

Figure 7C:
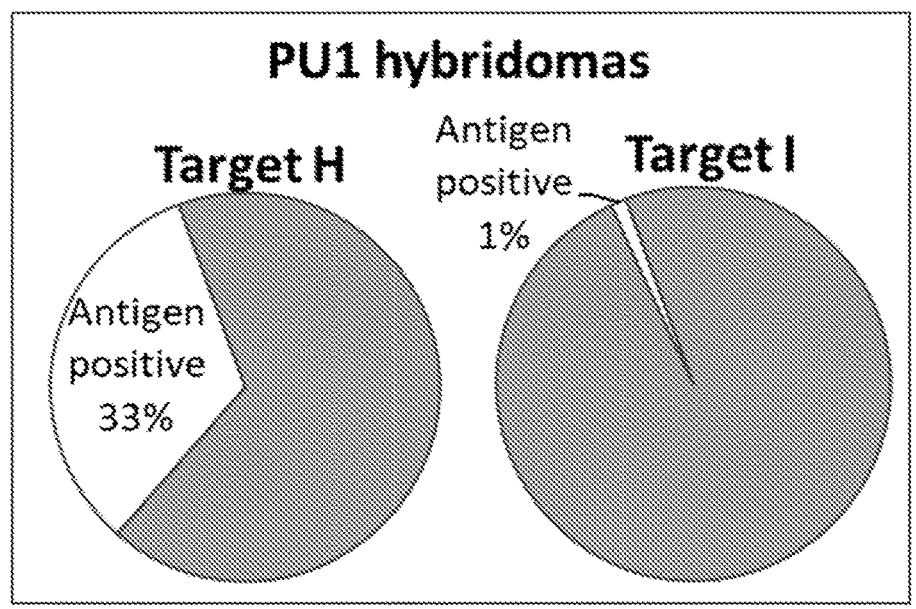
FIGS. 7C and 7D show the percentage of antigen-specific hybridomas generated using PU.1 or Sp2ab fusion partners.

FIG. 7C shows the percentage of antigen-specific hybridomas from IgG-based sorting using PU1 fusion partner. Antigen-positive percentage is shown as a function of IgG-expressing wells.

The same cell populations described above were fused with SP2ab mouse myeloma cells (Enzo Life Sciences) via electrofusion (Harvard Apparatus). Fused cells were incubated at 37° C., 7% $CO_2$, overnight in Medium C (StemCell Technologies), before plating into 6-well plates containing Medium E (StemCell Technologies) supplemented with 1×HAT (Sigma-Aldrich) and incubated at 37° C., 7% $CO_2$ for three days. Cells were collected and stained with allophycocyanin-labeled anti-rat IgG (Jackson Immunoresearch) and phycoerythrin-labeled target H or I protein as appropriate (Genentech). $IgG^+Ag^+$ cells were sorted using a FACSAria Fusion sorter (BD Biosciences) into 96-well plates. Seven days after plating, supernatants were screened by ELISA against immunization protein.

Figure 7D:
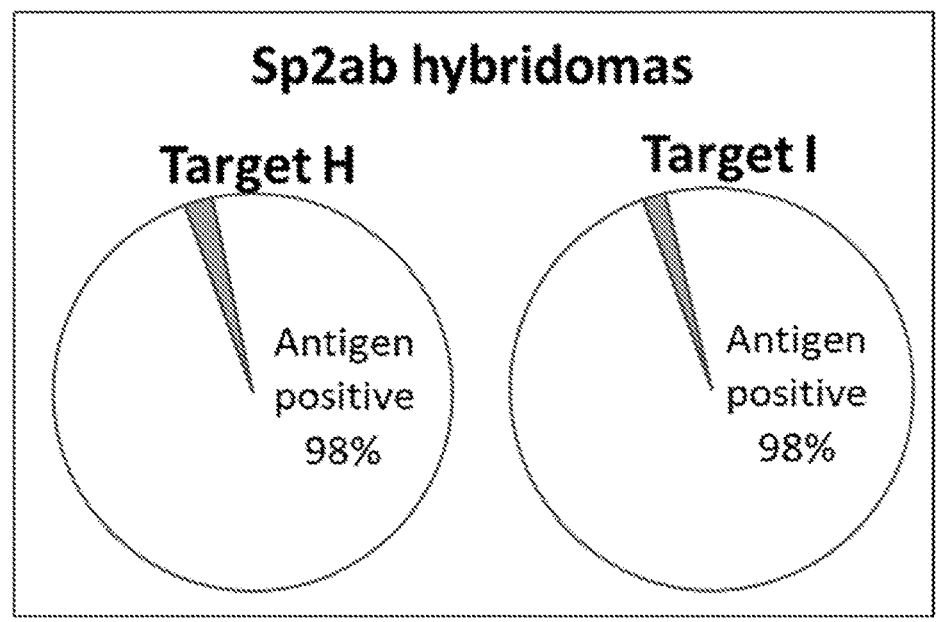

FIG. 7D shows the percentage of antigen-specific hybridomas from antigen-based sorting using Sp2ab fusion partner. Antigen-positive percentage is shown as a function of IgG-expressing wells.

REFERENCES

Price, et al. Engineered cell surface expression of membrane immunoglobulin as a means to identify monoclonal antibody-secreting hybridomas. *J. Immunol Methods.* 2009 Mar. 31; 343(1): 28-41.

Harlow, E.; Lane, D P. Antibodies: A Laboratory Manual. CSH Laboratory Press; Cold Spring Harbor, NY: 1988.

What is claimed is:

1. A method for producing an antibody library, the method comprising:
    (a) injecting one or more animals with an antigen;
    (b) harvesting draining lymph nodes comprising B cells from each animal;
    (c) forming a hybridoma between each B cell and a fusion partner; and
    (d) screening the hybridomas for IgG having binding specificity to the antigen;
    wherein at least five of the following conditions apply:
    (i) the animals are outbred animals;
    (ii) the animals are injected at multiple sites;
    (iii) the animals are injected every two weeks;
    (iv) the animals are injected for between 6 weeks and 15 weeks;
    (v) multiple adjuvants are used, such that different animals are injected with different adjuvants; and/or
    (vi) B cells are enriched prior to step (c).

2. The method of claim 1, wherein step (a) comprises injecting two or more animals with an antigen.

3. The method of claim 1, wherein the animals are rats.

4. The method of claim 1, wherein the multiple sites are sites near draining lymph nodes.

5. The method of claim 1, wherein the multiple sites comprise one or more of back, shoulder, intraperitoneal, base of tail, and hock.

6. The method of claim 1, wherein the animals are injected at multiple sites and the amount of antigen injected at each site is between 0.1 µg and 300 µg.

7. The method of claim 1, wherein the animals are injected not more than once a week.

8. The method claim 1, wherein the animals are injected not more than once every two weeks.

9. The method of claim 1, wherein the animals are injected for between 6 weeks and 15 weeks.

10. The method of claim 1, wherein the multiple adjuvants comprise complete Freund's adjuvant, Ribi, and/or TLR agonist cocktail.

11. The method of claim 1, wherein the B cells are enriched by negative selection.

12. The method of claim 1, wherein the fusion partner is engineered to express both surface and secreted IgG.

13. The method of claim 1, wherein screening the hybridomas comprises FACS sorting for expression of IgG antibodies that are specific to the antigen.

14. An antibody library prepared using the method of claim 1.

15. A hybridoma library prepared using the method of claim 1.

16. The method of claim 1, wherein the five conditions comprise condition (iii).

17. The method of claim 1, wherein the five conditions comprise condition (v).

* * * * *